United States Patent [19]
Oikawa et al.

[11] Patent Number: 5,694,161
[45] Date of Patent: Dec. 2, 1997

[54] IMAGE FORMING APPARATUS WITH A LIGHT DIRECTING DEVICE FOR VARYING DENSITY OF AN IMAGE

[75] Inventors: Tomohiro Oikawa, Chiba; Iwakazu Honda; Yoichi Yamamoto, both of Nara, all of Japan

[73] Assignee: Sharp Kabushiki Kaisha, Osaka, Japan

[21] Appl. No.: 347,062

[22] Filed: Nov. 23, 1994

[30] Foreign Application Priority Data

Dec. 14, 1993 [JP] Japan .............................. HEI 5-313685

[51] Int. Cl.$^6$ ...................................................... B41J 2/47
[52] U.S. Cl. ............................................. 347/239; 347/136
[58] Field of Search ................................. 347/239, 255, 347/135, 136, 238, 241

[56] References Cited

U.S. PATENT DOCUMENTS

| | | | |
|---|---|---|---|
| 4,571,603 | 2/1986 | Hornbeck et al. | 347/239 |
| 4,596,992 | 6/1986 | Hornbeck. | |
| 4,793,699 | 12/1988 | Tokuhara. | |
| 5,028,939 | 7/1991 | Horneck et al.. | |
| 5,150,250 | 9/1992 | Setani. | |
| 5,285,196 | 2/1994 | Gale, Jr. | 345/108 |
| 5,452,024 | 9/1995 | Sampsell | 348/755 |

FOREIGN PATENT DOCUMENTS

| | | |
|---|---|---|
| 0437766 | 7/1991 | European Pat. Off.. |
| 0493742 | 7/1992 | European Pat. Off.. |
| 0549877 | 7/1993 | European Pat. Off.. |
| 62-296175 | 12/1987 | Japan. |
| 2120062 | 5/1990 | Japan. |

Primary Examiner—Mark J. Reinhart

[57] ABSTRACT

An image forming apparatus includes a photoreceptor allowing an electrostatic latent image to be formed by light exposure, a light source emitting light beams, a light deflecting device for deflecting light beams from the light source, an exposure controlling device for controlling deflecting actions of the deflecting device, and an image-forming optical device receiving light beams deflected by the light deflecting device and image-forming the light beams on the photoreceptor so as to create a latent image composed of a plurality of pixels thereon. In the configuration, the light deflecting device includes a micro-mirror array device which is composed of a multiple number of mirror facet elements arranged matrix-wise, in two-dimensions, and which is disposed so that each row of the mirror facet elements extends in parallel with the rotating axis of the photoreceptor and normals of the mirror facet elements are substantially perpendicular to the rotating axis of the photoreceptor. Each of the mirror facet elements in a single column can individually be controlled to be oriented at any angle to simultaneously deflect light to the same location on the photoreceptor to vary density of the image formed thereon.

16 Claims, 3 Drawing Sheets

AUXILIARY SCAN

MAIN SCAN

IMAGE FORMING APPARATUS WITH A LIGHT DIRECTING DEVICE FOR VARYING DENSITY OF AN IMAGE

BACKGROUND OF THE INVENTION

(1) Field of the Invention

The present invention relates to an image forming apparatus which, based on image signals representing characters, patterns etc., creates an image with a great number of pixels in the form of a latent image on a surface of a photoreceptor. Particularly, the invention is directed to an image forming apparatus which creates a latent image on the photoreceptor surface by using a novel light deflecting device.

(2) Description of the Prior Art

A laser printer having a semiconductor laser as a light source thereof, emits a laser beam, which in turn is deflected for scanning by a rotating polygonal mirror so as to irradiate a rotating photoreceptor Thereby an electrostatic latent image corresponding to an image to be formed is created on the photoreceptor surface. Thereafter, the thus formed latent image is formed into an actual image on a transfer sheet by way of operations such as developing, transferring and fixing.

In the field of the laser printers, in order to improve quality of recording images, especially for modifying jaggedness in slant line portions etc., some laser printers have been proposed in which illuminating time of a semiconductor laser is controlled to diminish jagged portions. Specifically, the modification is achieved by controlling the timing of illumination of the laser or by selecting combinations of lighted time and unlighted time of the laser so that jagged portions may be interpolated with dots. Interpolation is also performed by adding dots utilizing overlapping base portions or slowly attempting plateau parts of a Gaussian light intensity distribution of the laser beam.

On the other hand, in LED printers using a light-emitting diode (LED) array as a light source, the LED array is disposed substantially parallel to a rotational axis of a photoreceptor and will write image information on characters, patterns etc., onto the photoreceptor by one line in the main scanning direction simultaneously. LED printers, unlike laser printers, do not need any light deflecting device such as a rotating polygonal mirror etc. since there is no necessity of a deflecting light beam for scanning.

However, in LED printers, it is not laser printer, to control light output and illuminating time of a light beam four the purpose of enhancing resolution of images. One of the reasons for the difficulty is due to the fact that, while a semiconductor laser as a writing light source of laser printers has a Gaussian light intensity distribution which has slowly attenuating plateau parts in its periphery, the light intensity of an LED is in the form of an approximately plateau distribution which attenuates steeply in its periphery without spreading.

Further, in laser printers, when one dot is written in, the size of the dot may be changed or additional dots can be created therearound appropriately for superposingly exposing neighboring dots by utilizing outlying parts of the Gaussian light intensity distribution of the dot, in order to make the output image of a high-resolution. However, it is difficult to apply a technique for high-resolution of this kind to LED printers since the outlying light intensity of the LED is small.

Thus, in the conventional laser printers, jaggedness in slanting portion and the like could be modified by shifting dots or making dots small, but this method suffered from the following drawbacks:

1) In typical laser printers, illuminating time of the semiconductor laser for writing must be regulated in the order of some tens of nano-seconds, in order to make the dot size small or create additional dots around the dot for modifying jaggedness in a slanting portion and the like. However, it is very difficult to precisely control the laser beam in the order of some tens of nano-seconds.

2) Since the rotational rate of the rotating polygonal mirror for deflection-scanning the laser beam is limited (to about 10,000 to 15,000 rpm), there is an upper boundary for getting the laser printer speeded up. This upper boundary not only limits the development of the laser printer itself into high-speed but also restricts the development for accompanying high-resolution, to a great extent.

3) The rotating polygonal mirror exhibits rotational irregularity at high-speed driving, so this is an obstacle to the development for high-resolution.

On the other hand, in the conventional LED printers, image information is written in on the photoreceptor by one line as a unit in the rotational axial direction of the photoreceptor or in the main scanning direction while the light intensity distribution of an LED is in the form of substantially plateau feature, so that the light intensity at sites away from the center of the LED is weak. Therefore, it is difficult to vary light energy distribution imparted to the photoconductor by superposing light beams irradiated on the photoconductor. Accordingly, it is difficult to improve the resolution by shifting or adding dots as conducted in laser printers.

Meanwhile, in LED printers, each illuminating element of the LED array corresponds to a pixel on the main scan line on the photoreceptor, so that, by changing the illuminating time of each LED, it is theoretically possible to change the light energy density distribution on the photoreceptor, thereby varying the size of a single toner dot.

However, it is very difficult, in practice, to vary the size of single dots. This is because, if 256 halftoned gradation steps are attempted to be made for one single dot, the control of illuminating time of an LED for realizing this must be done with time differential of the order of nanoseconds. This control is extremely difficult. Therefore, it is hardly feasible to reproduce halftoned images by varying the size of dots in the LED printer.

SUMMARY OF THE INVENTION

As has been stated heretofore, there are many difficulties as to laser printers and LED printers in technologies for both achieving high-speed processing and high-quality images and realizing high-resolution images and reproduction of halftoned images. The present invention is to provide a novel image forming apparatus which has overcome the above technological difficulties. The objects of the present invention are as follows:

1) to provide a novel image forming apparatus capable of high-quality image printing;

2) to provide a novel image forming apparatus which is pertinent to high-speed processing and high-quality image printing by using a novel light deflecting device with a light source;

3) to provide a novel image forming apparatus in which development for high-quality image printing such as modification of jaggedness in slanting portions of characters patterns etc. to be printed can be realized; and 4) to provide a novel image forming apparatus in which halftoned images are reproduced more naturally by properly varying the size of dots in characters and images composed of dot patterns, whereby high-quality images can be realized.

The present invention has been achieved to attain the above objects and a first aspect of the present invention resides in an image forming apparatus comprising: a photoreceptor allowing an electrostatic latent image to be formed by light exposure; a light source emitting light beams; a light deflecting means for deflecting light beams from the light source; an exposure controlling means for controlling deflecting actions of the deflecting means; and an image-forming optical means receiving light beams deflected by the light deflecting means and image-forming the light beams on the photoreceptor so as to create a latent image composed of a plurality of pixels thereon. and is constructed such that the light deflecting means comprising a micro-mirror array device which is composed of a plurality of mirror facet elements arranged matrix-wise in two-dimensions and which is disposed so that each row of the mirror facet elements extends in parallel with the rotating axis of the photoreceptor and each column of the mirror facet elements are substantially perpendicular to the rotating axis of the photoreceptor, and each mirror facet of the mirror facet elements can individually be controlled to be oriented at any angle by application of voltages.

In accordance with a second aspect of the present invention, an image forming apparatus includes: a photoreceptor allowing an electrostatic latent image to be formed by light exposure; a light source emitting light beams; a light deflecting means for deflecting light beams from the light source; an exposure controlling means for controlling deflecting actions of the deflecting means; and an image-forming optical means receiving light beams deflected by the light deflecting means and image-forming the light beams on the photoreceptor so as to create a latent image composed of a plurality of pixels thereon. the is constructed such that the light deflecting means includes a micro-mirror array device which is composed of a plurality of mirror facet elements arranged matrix-wise, in two-dimensions, and which is disposed substantially in one line so that each row of the mirror facet elements extends in parallel with the rotating axis of the photoreceptor and normals of the mirror facet elements are substantially perpendicular to the rotating axis of the photoreceptor, and each of the mirror facet elements can individually be controlled to be oriented at any angle by application of voltages, and the exposure controlling means individually varies deflecting mirror facet angles of the mirror facet elements, whereby the same positions on the photoreceptor are illuminated plural times in synchronization with the rotation of the photoreceptor so that light energy density distribution on the photoreceptor is modified.

In both of the above configurations of the present invention, it is effective that the apparatus further includes a beam splitting means for splitting light emitted from the light source into two portions toward the light deflecting means and the image-forming optical means, respectively. Further, it is also effective that the just above apparatus further has a mixing means for mixing light emitted from the light source, and the surface of the photoreceptor is exposed with the mixed light using the beam splitting means for splitting light emitted from the light source into two portions toward the light deflecting means and the image-forming optical means, respectively.

In accordance with a third aspect of the present invention, an image forming apparatus includes: a photoreceptor allowing an electrostatic latent image to be formed by light exposure; a light source emitting light beams; a light deflecting means for deflecting light beams from the light source; an exposure controlling means for controlling deflecting actions of the deflecting means; and an image-forming optical means receiving light beams deflected by the light deflecting means and image-forming the light beams on the photoreceptor so as to create a latent image composed of a plurality of pixels thereon. The image forming apparatus is constructed such that the light deflecting means includes a micro-mirror array device which is composed of a plurality of mirror facet elements arranged matrix-wise, in two-dimensions, and which is disposed substantially in one line so that each row of the mirror facet elements extends in parallel with the rotating axis of the photoreceptor and normals of the mirror facet elements are substantially perpendicular to the rotating axis of the photoreceptor, and each of the mirror facet elements can individually be controlled to be oriented at any angle by application of voltages, and the exposure controlling means individually varies deflecting mirror facet angles of the mirror facet elements in synchronization with the photoreceptor rotating, whereby light energy density distribution formed by light from the light source on the photoreceptor is modified so that the shape and feature of toner dot or images formed on the photoreceptor are changed.

In the above configuration of the present invention, it is effective that the apparatus further has a mixing means for mixing light emitted from the light source, and the surface of the photoreceptor is exposed with the mixed light using the beam splitting means for splitting light emitted from the light source into two portions toward the light deflecting means and the image-forming optical means, respectively.

In any of the above configurations of the present invention, it is possible to use as the light source a light emitting diode, a light emitting diode array composed of a set of plural light emitting diodes, or a fluorescent lamp.

In the configurations described above, the light deflecting means is constructed of a micro-mirror array device formed with a plurality of mirror facet elements arranged on the surface thereof, and mirror facet angles of different mirror facet elements are varied individually in accordance with the applied voltages thereto.

Light emitted from the light source, passing through the beam splitting means, enters the micro-mirror array device and the reflected light passes through the image-forming optical means to be image-formed on the surface of the photoreceptor. Further, all the mirror facet elements are deflected by application of voltages thereto at such angles that reflected light beams simultaneously expose one line in the main scan direction of the photoreceptor (or in the rotating axis direction of the photoreceptor).

That is, each of mirror facet elements is set up to be applied with a specific voltage so that all the mirror facet elements in each row, or first line to n-th line, which is composed of mirror facet elements lined up in the auxiliary direction of the micro-mirror array device (or in the perpendicular direction to the rotating axis direction of the photoreceptor), are deflected in such angles that the reflected light beams can simultaneously irradiate one identical line on the photoreceptor. Therefore, exposure of one line on the surface of the photoreceptor in the main scan direction is performed at the same time.

Regarding one single dot on the photoreceptor, the single dot simultaneously receives reflected light beams from n pieces of mirror facet elements lined up in the auxiliary scan direction in the micro-mirror array device. Accordingly, by controlling voltages applied to the different mirror facet elements lined up in the auxiliary scan direction, the single dot on the photoreceptor can be exposed with light having maximally n steps of light energy density.

Attenuation of the surface potential on the photoreceptor becomes large in proportion to the amount of light energy irradiated. Therefore, by controlling the voltages applied to the mirror facet elements lined up in the auxiliary direction for irradiating the same spot on the photoreceptor, it is possible to freely control the amount of light energy irradiated on the photoreceptor, and in consequence, it is possible to adjust the toner quantity adhered to the photoreceptor or the feature of the pixels on the image, thus making it possible to control gradation.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

The present invention will hereinafter be described in detail with reference to the accompanying drawings.

Figure 1:
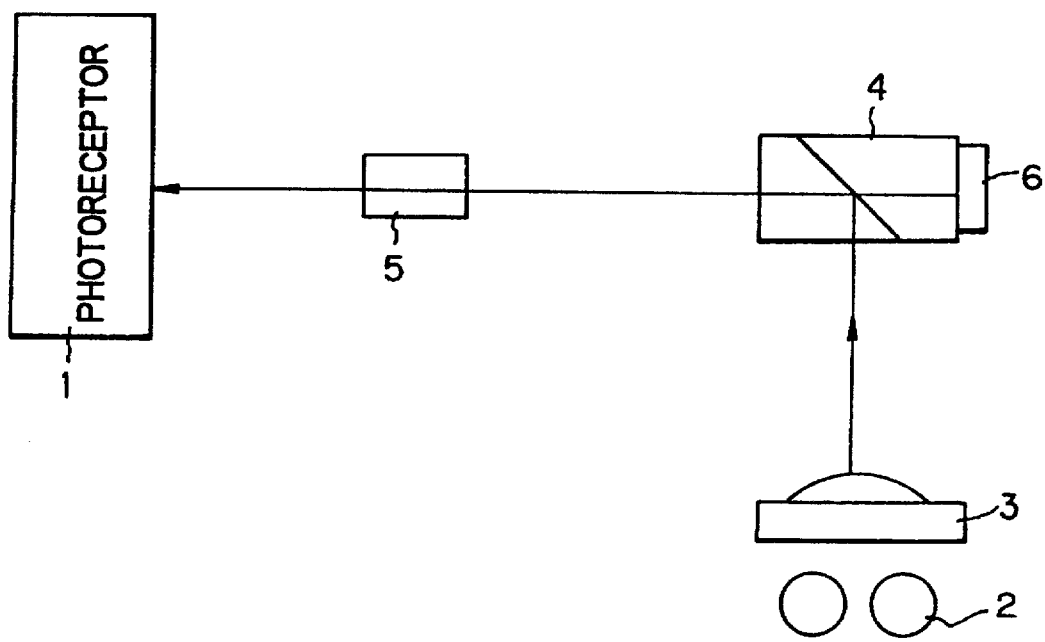
FIG. 1 is a schematic block diagram showing an embodiment of an image forming apparatus of the present invention.

FIG. 1 is a schematic block diagram showing an embodiment of an image forming apparatus of the present invention. In the embodiment, a light emitting diode (LED 2) is disposed substantially in parallel with a rotational direction of a photoreceptor 1, and is used as a light source for creating electrostatic latent images onto the photoreceptor 1.

Light emitted from the LED 2 is made uniform by a light mixing device 3. This light mixing device 3 is used to shape the light from the LED 2 into diffused light, and hence includes a light-diffusing plate disposed in the light progressing path therein. Because light emitted from LED 2 has a certain light intensity distribution, the light directly entering a micro-mirror array device 6 without passing through the light mixing device 3, would be ununiform, thereby possibly causing a bad influence upon the light energy density distribution on the photoreceptor and therefore degrading printed images. A light diffusing plate, which is known as a typical device for diffusing light, can be applied to the present invention.

The light thus uniformalized is incident on a beam splitting device 4.

This embodiment uses a prism type beam splitter as the beam splitting device 4, which changes the light path of the light incident from the light mixing device 3 toward a micro-mirror array device 6. It is to be understood that the configuration of the present invention should not be limited by the prism type beam splitter since any other device for deflecting light can properly be used as long as it yields the same effect.

In this way, the beam splitting device 4 used here does not aim at splitting light beam in a certain ratio, but is merely used to change the light path. Meanwhile, in view of writing performances of images onto the photoreceptor 1, it is effective that the micro-mirror array device 6 is relatively arranged in parallel with the photoreceptor 1. Accordingly, the micro-mirror array device 6 must be disposed relative to the light source LED 2 as in the arrangement shown in FIG. 1, which requires the beam splitting device 4 for deflecting the light path.

The light incident on the beam splitting device 4 is divided into two parts, i.e., one for an image forming optical device (projection mirror) 5 and one for the micro-mirror array device 6. The part of light channeled toward the image forming optical device 5 is image-formed on the photoreceptor 1 while the part of light channeled toward the micro-mirror array device 6 is partly reflected to create light spots, which in turn are image-formed on the photoreceptor 1 by way of the image forming optical device 5.

The micro-mirror array device 6 allows each micro-mirror to turn on or off the light that comes from the LED 2 in accordance with the image information to be printed, so that one line dot pattern along the main scanning direction (or in the rotating axis direction of the photoreceptor 1) may be exposed simultaneously on the photoreceptor 1. This operation of forming one line dot pattern is repeated to form an electrostatic latent image on the photoreceptor by reducing the surface potential of the photoreceptor according to the image information. The thus formed electrostatic latent image is visualized in the developing process to form a toner dot pattern. The principle of the process of forming toner images on the photoreceptor 1 is to be based on the well-known photoelectrographic process.

Figure 2:
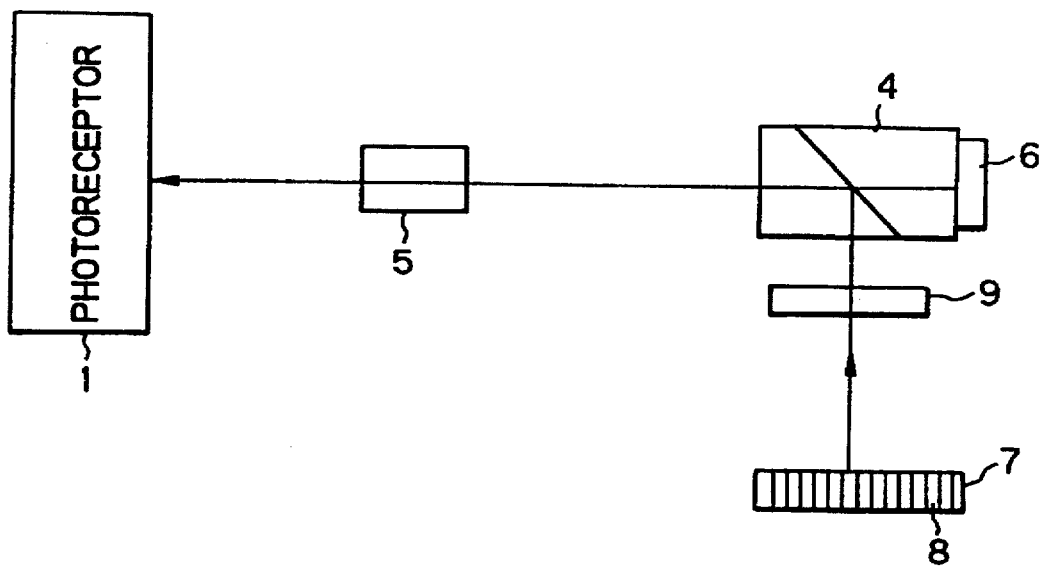
FIG. 2 is a schematic block diagram showing another embodiment of an image forming apparatus of the present invention.

Next, FIG. 2 is a schematic block diagram showing another embodiment of an image forming apparatus of the present invention. In the embodiment, an LED array 7 as a light source, is disposed substantially in parallel with a rotational direction of a photoreceptor 1. Light beams emitted from different light emitting elements 8 arranged along the main scanning direction in the LED array 7, passing through a beam splitting means 4, are image-formed by an image forming device 9 on respective mirror facet elements 61 (see FIG. 3) arranged in the main scanning direction in the micro-mirror array device 6. Then, the reflected light beams on different mirror facet elements, passing through the beam splitting device 4, are made incident on an image forming optical device 5 in which the incident beams are to be shaped into light spots and projected on the photoreceptor 1. In this case, since the image forming device 9, unlike the light mixing device 3 which is provided in the embodiment shown in FIG. 1 to diffuse and uniformalize light, is to image-form light beams from the LED array 7 upon the micro-mirror array device 6, a typical convex lens may be used as this device.

The micro-mirror array device 6 allows each micro-mirror to turn on or off the light beam that comes from each light emitting element 8 in the LED array 7 in accordance with the image information to be printed, so that one line dot pattern along the main scanning direction may be exposed simultaneously on the photoreceptor 1. This operation of forming one line dot pattern is repeated to form an electrostatic latent image on the photoreceptor by reducing the surface potential of the photoreceptor according to the image information. The thus formed electrostatic latent image is visualized in the developing process to form a toner dot pattern. The principle of the process of forming toner images on the photoreceptor 1 is to be based on the well-known photoelectrographic process.

Figure 3:
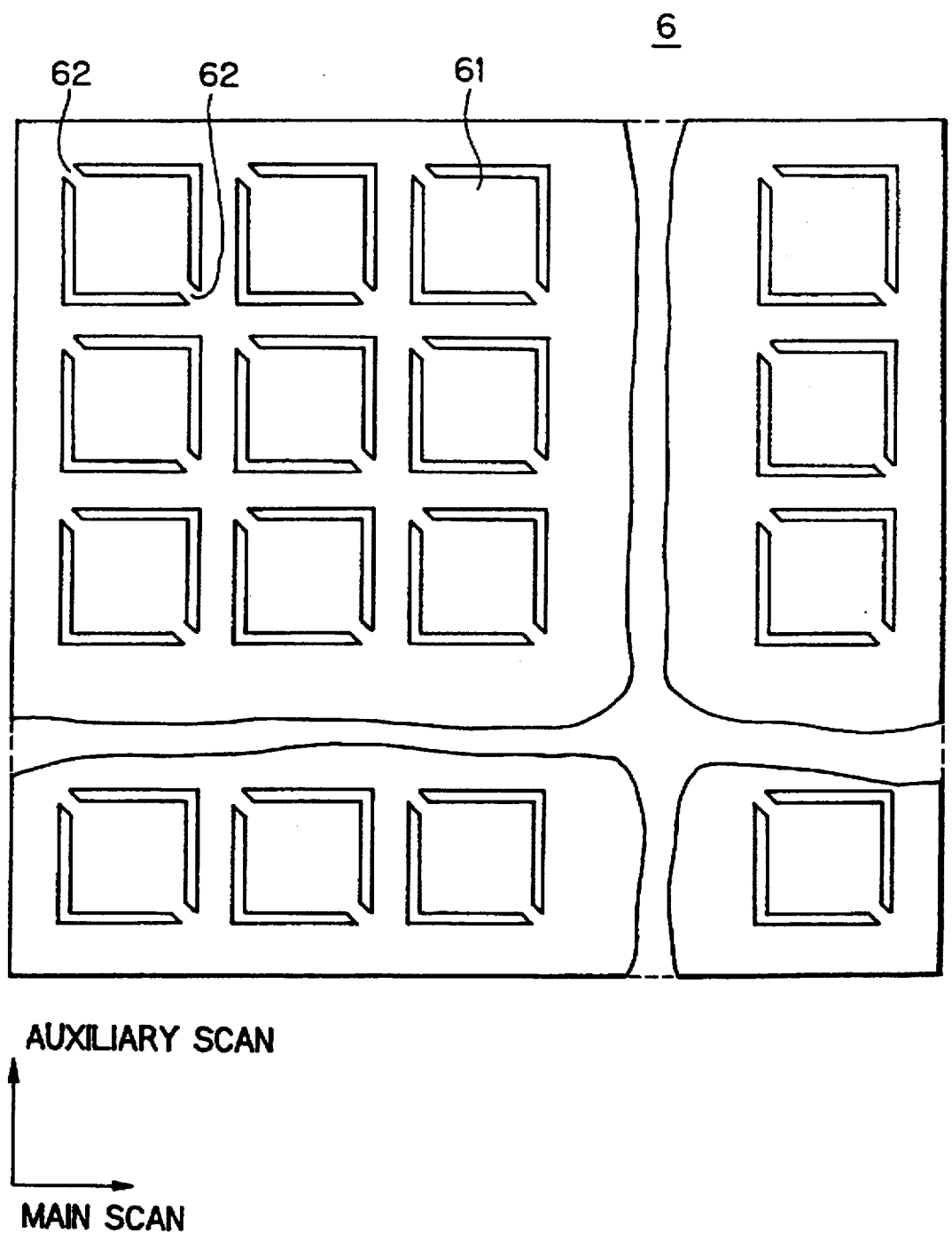
FIG. 3 is a front view showing a structure of a micro-mirror array device.
Figure 4:
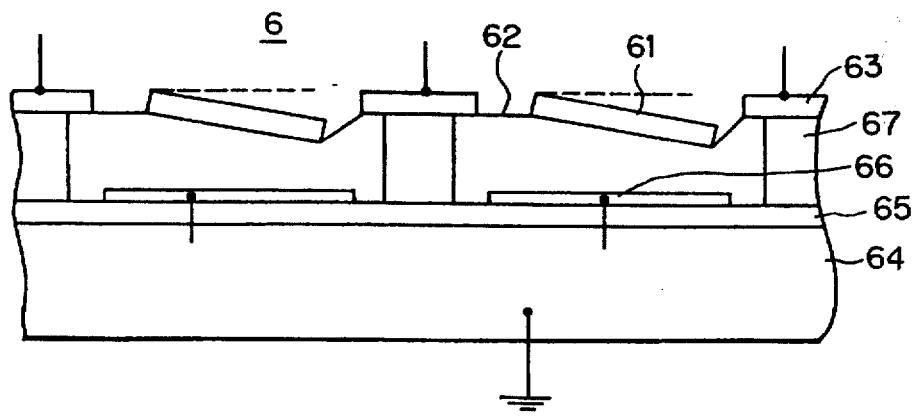
FIG. 4 is a sectional view showing a structure of a micro-mirror array device.

Now, the structure of the micro-mirror array device 6 will be illustrated. FIGS. 3 and 4 are front and sectional views showing a structure of the micro-mirror array device 6. The micro-mirror array device 6 includes, as shown in FIG. 3, a plurality of mirror facet elements 61 formed by surface-deposition or any other technique. Each of the mirror facet elements 61 is of substantially a square with each side of about 17 μm long and is supported by a pair of beams 63 provided at approximately diagonal vertexes (see FIG. 4).

More specifically, the micro-mirror array device 6, as shown in FIG. 4, is composed of a conductive substrate 64 with an insulating material 65 layered thereon. Each mirror unit includes an address electrode 66 which is connected to the conductive substrate 64 with the insulating material 65 therebetween, a spacer 67, a conductive member 63 on the top of the spacer 67 and a mirror facet element 61 supported by a pair of beams 62 of conductive material. In this arrangement, if a predetermined, voltage is applied selectively to one of the mirror units between its address electrode 66 and conductive member 63, the mirror facet element 61 is deflected from a position shown by a solid line to a position shown by a broken line in the figure, so that the light beam may be reflected onto the photoreceptor.

In this embodiment, the micro-mirror array device 6 includes a great number of mirror facet elements 61 arranged matrix-wise. Specifically, 5,100 pieces of mirror facet elements 61 are arranged in a line in the main scan direction and about 128 to 256 rows of such lines are arranged in the auxiliary scan direction. Here, suppose that there are 128 lines in the auxiliary scan direction. This corresponds to reproduction of 128 steps of gradation while, with 256 lines, 256 steps of gradation can be reproduced. In this way, it is possible to arbitrarily set up a desired number of gradation.

The micro-mirror array device 6 has the following configurations and features as stated below.

1) Speed of response (on to off or off to on) is about 10 μsec.

2) Each mirror facet element is a 17 μm square.

3) The deflecting angle of the mirror facet caused by application of voltage is ±10 deg. with precision of ±0.1 deg.

4) Mirror facet elements are arranged at intervals of 17 μm.

5) Reflectance of the mirror facet is 88% to 92%.

6) In a case of A4 size transfer sheets being set, 2,550 pieces of the mirror facet elements are arranged in the main scan direction for a print density of 300 DPI, while 5100 pieces of the elements are arranged in the same direction for a print density of 600 DPI. The number of the mirror facet elements arranged in the auxiliary direction corresponds to the number of gradation steps.

7) Each mirror facet on an auxiliary scan-directional line is arranged so that the center of the mirror corresponds to the center of the neighboring mirror facet elements on the same auxiliary scan-directional line.

Next, the operating principle of the micro-mirror array device 6 will be explained. As stated above, each mirror facet element 61 of the micro-mirror array device 6 is supported by a pair of beams 62 and is applied with a predetermined voltage through the beams 62. On the other hand, an address electrode 66 is formed under each mirror facet element 61 and is similarly applied with a predetermined voltage.

Therefore, an electric field is generated between each mirror facet element 61 and its opposing address electrode 66, whereby the conductive mirror facet element 61 supported by beams 62 is finely displaced so that the mirror facet is deflected. Thus, all the mirror facet elements 61 of the micro-mirror array device 6 are deflected in this way. Here, the deflecting angle of each mirror facet element 61 is determined based on the voltages applied to respective electrodes.

As described heretofore, each mirror facet element 61 of the micro-mirror array device 6 can be arbitrarily deflected at any angle by the extension of beams 62, therefore, the mirror facet element can reflect the light coming from the LED 2 toward an arbitrary direction within a certain limited range. That is, all the components of the apparatus including the LED 2, the beam splitting device 4, the micro-mirror array device 6, the image-forming optical device 5 and the photoreceptor 1 are arranged in such a manner that, when no voltage is applied to the micro-mirror array device 6, the light incident from the LED 2 on the micro-mirror array device 6 will not irradiate on the photoconductor 1 while the light incident on the micro-mirror array device 6 will be image-formed on predetermined positions when predetermined voltages are applied to the micro-mirror array device 6.

Figure 5:
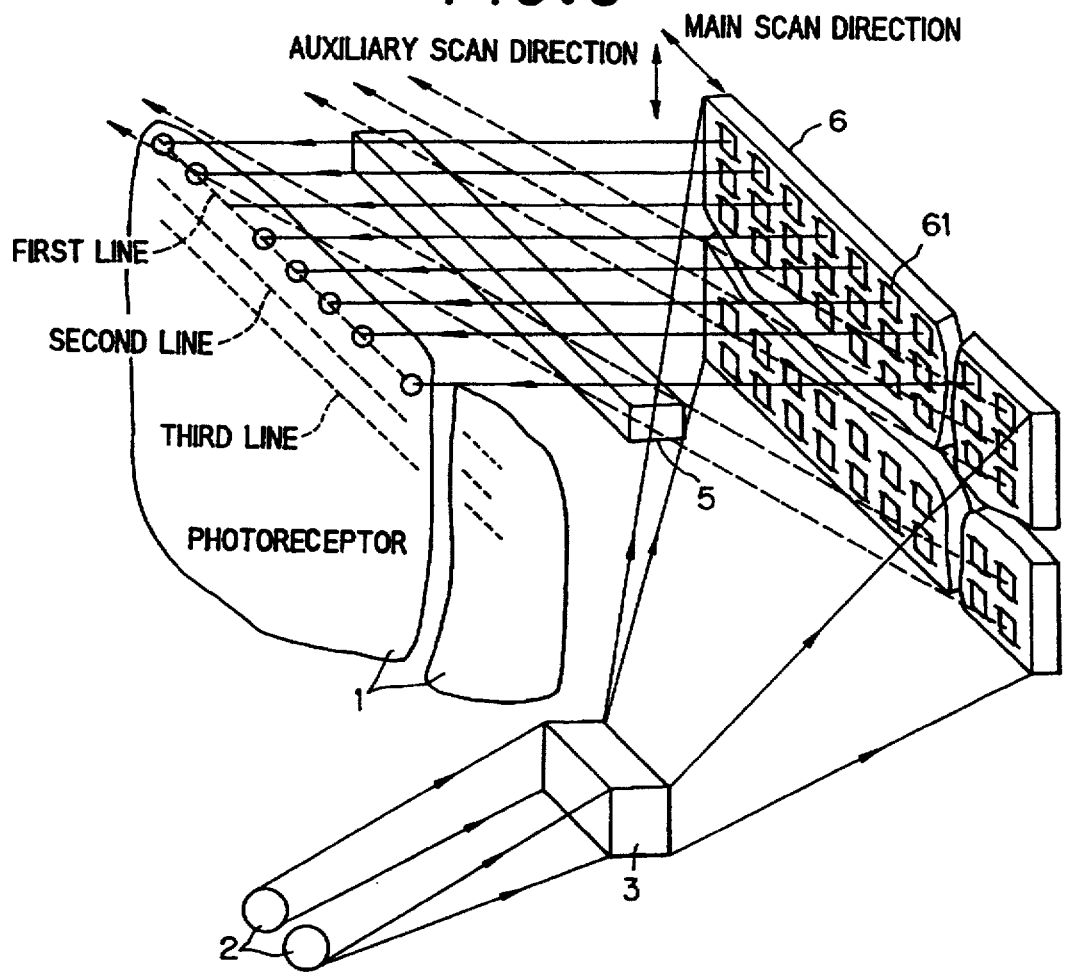
FIG. 5 is a perspective view illustrating the operation of the image forming apparatus shown in FIG. 1.

Referring next to FIG. 5, the operation of writing of information according to an image onto the photoreceptor 1 will be explained by exemplifying the image forming apparatus (FIG. 1) using the LED 2 and the micro-mirror array device 6. Here, the beam splitting device 4 to be on the front side of the micro-mirror array device 6 is not shown in FIG. 5 for simplicity.

Mirror facet elements 61 of the micro-mirror array device 6 are arranged matrix-wise, as stated above, with about 5,100 pieces along a line in the main scan direction and 128 (or 256) rows of such lines in the auxiliary scan direction. Each mirror facet element 61 is supported by at least a pair of beams 62 disposed diagonally so that the facet can be oriented toward arbitrary directions within a certain range of angles.

The light emitted from the LED 2, having been uniformalized through the light mixing device 3, passes through the beam splitting device 4 (not shown in FIG. 5) to irradiate the entire surface of the mirror-mirror array device 6. The mirror facet elements 61 on the first line, with respect to the auxiliary scan direction, of the micro-mirror array device 6 are set up to be deflected in such angles that the reflected light of the light from the LED 2 can simultaneously expose one main scan-directional line on the photoreceptor 1.

The mirror facet elements 61 on the second line, with respect to the auxiliary scan direction, of the micro-mirror array device 6 are deflected in such angles that the reflected light of the light from the LED 2 can expose the same line in the main scan-direction on the photoreceptor 1 at the same timing as the mirror facet elements 61 on the first line do.

Similarly, mirror facet elements 61 on third to 128th (or 256th) lines are set up with proper applying voltages so that the reflected light can expose the same line on the photoreceptor 1 at the same timing.

In this way, the light emitted from the LED 2, passing through the beam splitting device 4, is incident on the micro-mirror array device 6 and reflected thereon to be image-formed on the photoreceptor 1 by way of the image-forming optical device 5. Upon this, one line in the main scan direction on the photoreceptor 1 receives, at the same time, the reflected light from the mirror facet elements on the first to 128th (or 256th) lines, so that the one line in the main scan direction on the photoreceptor 1 is written in, simultaneously.

Considering one single dot on the photoreceptor 1, the single dot receives reflected light beams from 128 (or 256) pieces of mirror facet elements 61. That is, by controlling the voltage applied to each mirror facet element 61 in the micro-mirror array device 6, the single dot on the photoreceptor 1 can be exposed with light having maximally 128 (or 256) steps of light energy density. Here, in the case of A4 size image depicted in 400 DPI, the number of pixels on one line on the photoreceptor 1 amounts to about 5,000, which corresponds to the number of the mirror facet elements 61 along the main scan direction in the micro-mirror array device 6.

Next, description will be made on the operation of enhancing reproducing performances of halftoned images by making use of the features of the micro-mirror array device 6.

Meanwhile, the principle of creating toner images on the photoreceptor 1 is based on the electrophotographic process. At first, let us consider this principle, briefly. The photoreceptor 1 is uniformly charged at a certain voltage by means of a charger of corona discharging type, for example, and the thus charged surface potential is kept on. Then, the photoreceptor 1 is exposed with light from LED 2 etc., in accordance with image information to be written. Sections on the photoreceptor 1 which are exposed with light energy are reduced in surface potential due to the nature of the photoreceptor 1. Subsequently, in a developing unit, toner particles bearing the same polarity with that of the photoreceptor adhere to the potential-attenuated sections on the photoreceptor 1 which have been irradiated by the light. Thus, a toner image, corresponding to the image information, is created on the photoreceptor 1, and the toner image on the photoreceptor 1 is transferred onto a transfer sheet in a transfer section composed of a transfer charger and the like so that a desired image is formed on the transfer sheet. Then, the transfer sheet is conveyed to a fixing unit composed of a pair of heat rollers where the toner image on the transfer sheet is heated and fused to be fixed on the transfer sheet.

Now, the relationship between voltage attenuation of the photoreceptor 1 and the light energy the photoreceptor 1 receives will be explained referring to the case where the LED is used as a light source. In an image forming apparatus such as LED printers etc., in which the electrophotographic process is performed to create an electrostatic latent image on the photoreceptor 1, an LED is turned on for a predetermined time (which is called a pulse width) so that light energy required for forming one pixel is imparted to the photoreceptor 1.

Such pixels lined up are formed along the main scan direction (the rotating axial direction of the photoreceptor) and then such lines of pixels are repeatedly formed in the auxiliary scan direction, so that a dot matrix for one transfer sheet is formed on the surface of the photoreceptor 1. Here, the shape of the single pixel formed on the surface of the photoreceptor 1 is determined depending on the recorded energy density of LED light irradiated on the photoreceptor 1.

Accordingly, with a spotted beam of the LED light having a substantially elliptic shape (here, the size in the main scan direction is designated by WX and the size in the auxiliary direction is designated by WY), suppose that the area on the photoreceptor 1 which has light energy density of more than a predetermined level (for example, A [$\mu J/cm^2$]) becomes final visual dots or images, toner particles will adhere to only the photoreceptor regions which have received light, from the LED, having light energy density of more than A. Since, in practice, the light energy density distribution of the LED is of a substantially plateau shape, it is possible to numerically determine the light energy distribution provided on the photoreceptor 1 using LED output, pulse width, scanning speed in the auxiliary direction, beams spot size etc., as input parameters.

As stated heretofore, light emitted from the LED 2 is irradiated on the photoreceptor 1 and reduces the surface potential of the photoreceptor 1. The attenuation of the surface potential on the photoreceptor 1 becomes large in proportion to the amount of light energy irradiated. In the present invention, as illuminating light from the LED is reflected by the micro-mirror array device 6, mirror facet elements 61 of the micro-mirror array device 6 which are aligned on one line in the auxiliary direction, reflect the light beams from LED onto the same single point on the photoreceptor 1. Therefore, by controlling the number of the mirror facet elements 61 aligned in the auxiliary direction for irradiating the same spot on the photoreceptor 1, it is possible to control the amount of light energy irradiated on the photoreceptor 1. Accordingly it is further possible to adjust the toner quantity adhered to the photoreceptor or the feature of the pixels on the image. It is to be understood that as the light source, a fluorescent lamp light may be used in place of the LED.

As is apparent from the embodiment, according to the present invention, light spots can be irradiated at a high speed with high precision on predetermined positions on the photoreceptor. Therefore it is possible to create high-quality images. Further, since a plurality of light beams are irradiated on the same point on the photoreceptor, it is possible to create high-quality images.

In addition, according to the present invention, since light energy irradiated on predetermined positions on the photoreceptor can be arbitrarily controlled, it is possible to create high-quality images. It is further possible to control toner image shape (especially, its dot size) of a single dot formed on the photoreceptor. Consequently this enables the high-quality reproduction of halftoned images formed of dot patterns.

What is claimed is:

1. An image forming apparatus comprising:

a photoreceptor for forming an electrostatic latent image by light exposure;

a light source emitting light;

light deflecting means for deflecting light from said light source;

exposure controlling means for controlling deflecting actions of said light deflecting means;

image-forming optical means for receiving light deflected by said light deflecting means and for image-forming the light on said photoreceptor so as to create the electrostatic latent image composed of a plurality of pixels thereon; and beam splitting means for splitting the light emitted from the light source into two portions, one toward each of the light deflecting means and image-forming optical means, said light deflecting means including a micro-mirror array device composed of a plurality of mirror facet elements arranged in a two-dimensional matrix disposed such that each row of said mirror facet elements extends in parallel to the rotating axis of said photoreceptor and each column of said mirror facet elements are substantially perpendicular to the rotating axis of said photoreceptor, wherein each of said mirror facet elements is individually controllable to be oriented at any angle, and wherein a plurality of mirror facet elements in a single column are controllable to simultaneously deflect light to the photoreceptor to vary density of the image formed by the photoreceptor.

2. An image forming apparatus comprising:

a photoreceptor for forming an electrostatic latent image by light exposure;

a light source emitting light;

light deflecting means for deflecting light from said light source;

exposure controlling means for controlling deflecting actions of said light deflecting means; and image-forming optical means for receiving light deflected by said light deflecting means and for image-forming the light on said photoreceptor so as to create the electrostatic latent image composed of a plurality of pixels thereon, said light deflecting means including a micro-mirror array device composed of a plurality of mirror facet elements arranged in a two-dimensional matrix disposed such that each row of said mirror facet elements extends in parallel to the rotating axis of said photoreceptor and each column of said mirror facet elements are substantially perpendicular to the rotating axis of said photoreceptor, wherein each of said mirror facet element is individually controllable to be oriented at any angle and said exposure controlling means individually varies deflecting mirror facet angles of said mirror facet elements, whereby a single position on said photoreceptor is simultaneously illuminatable, by a plurality of mirror facet elements in a single column, a plurality of times in synchronization with the rotation of said photoreceptor to thereby create modifiable light energy density distribution on said photoreceptor.

3. An image forming apparatus according to claim 2, further comprising beam splitting means for splitting the light emitted from said light source into two portions, one toward each of said light deflecting means and said image-forming optical means.

4. An image forming apparatus according to claim 2, further comprising mixing means for mixing light emitted from said light source, wherein a surface of said photoreceptor is exposed with said mixed light using said beam splitting means for splitting light emitted from said light source into two portions, one toward each of said light deflecting means and said image-forming optical means.

5. An image forming apparatus according to claim 3, further comprising mixing means for mixing light emitted from said light source, wherein a surface of said photoreceptor is exposed with said mixed light using said beam splitting means for splitting light emitted from said light source into two portions, one toward each of said light deflecting means and said image-forming optical means.

6. An image forming apparatus comprising:

a photoreceptor for forming an electrostatic latent image by light exposure;

a light source emitting light;

light deflecting means for deflecting light from said light source;

exposure controlling means for controlling deflecting actions of said light deflecting means; and image-forming optical means for receiving light deflected by said light deflecting means and for image-forming the light on said photoreceptor so as to create the electrostatic latent image composed of a plurality of pixels thereon, said light deflecting means including a micro-mirror array device composed of a plurality of mirror facet elements arranged in a two-dimensional matrix disposed such that each row of said mirror facet elements extends in parallel to the rotating axis of said photoreceptor and each column of said mirror facet elements are substantially perpendicular to the rotating axis of said photoreceptor, wherein each of said mirror facet elements is individually controllable to be oriented at any angle and said exposure controlling means individually varies deflecting mirror facet angles of said mirror facet elements in synchronization with rotations of said photoreceptor, whereby light energy density distribution formed by light from said light source on said photoreceptor is modifiable by simultaneously controlling a plurality of mirror facet elements in a single column to vary shape of a toner dot formed on said photoreceptor.

7. An image forming apparatus according to claim 6, further comprising, mixing means for mixing light emitted from said light source, wherein a surface of said photoreceptor is exposed with said mixed light; and beam splitting means for splitting light emitted from said light source into two portions, one toward each of said light deflecting means and said image-forming optical means.

8. An image forming apparatus according to claim 1, wherein said light source is one of a light emitting diode, a light emitting diode array composed of a plurality of light emitting diodes, and a fluorescent lamp.

9. An image forming apparatus according to claim 2, wherein said light source is one of a light emitting diode, a light emitting diode array composed of a plurality of light emitting diodes, and a fluorescent lamp.

10. An image forming apparatus according to claim 6, wherein said light source is one of a light emitting diode, a light emitting diode array composed of a plurality of light emitting diodes, and a fluorescent lamp.

11. The image forming apparatus of claim 1, wherein a single position on said photoreceptor simultaneously receives light beams deflected from a predetermined number of mirror facet elements in a single column of said micromirror array to produce an image of a predetermined density.

12. The image forming apparatus of claim 2, wherein light energy density distribution is modified to vary shape of a toner dot of the electrostatic latent image formed by the photoreceptor.

13. The image forming apparatus of claim 11, wherein light energy density distribution is modified to vary shape of a toner dot of the electrostatic latent image formed by the photoreceptor.

14. The image forming apparatus of claim 2, wherein a single position on said photoreceptor simultaneously receives light beams deflected from a predetermined number of mirror facet elements in a single column of said micromirror array to produce an image of a predetermined density.

15. The image forming apparatus of claim 14, wherein light energy density distribution is modified to vary shape of a toner dot of the electrostatic latent image formed by the photoreceptor.

16. The image forming apparatus of claim 6, wherein a single position on said photoreceptor simultaneously receives light beams deflected from a predetermined number of mirror facet elements in a single column of said micromirror array to produce an image of a predetermined density.

* * * * *